Figure 1:
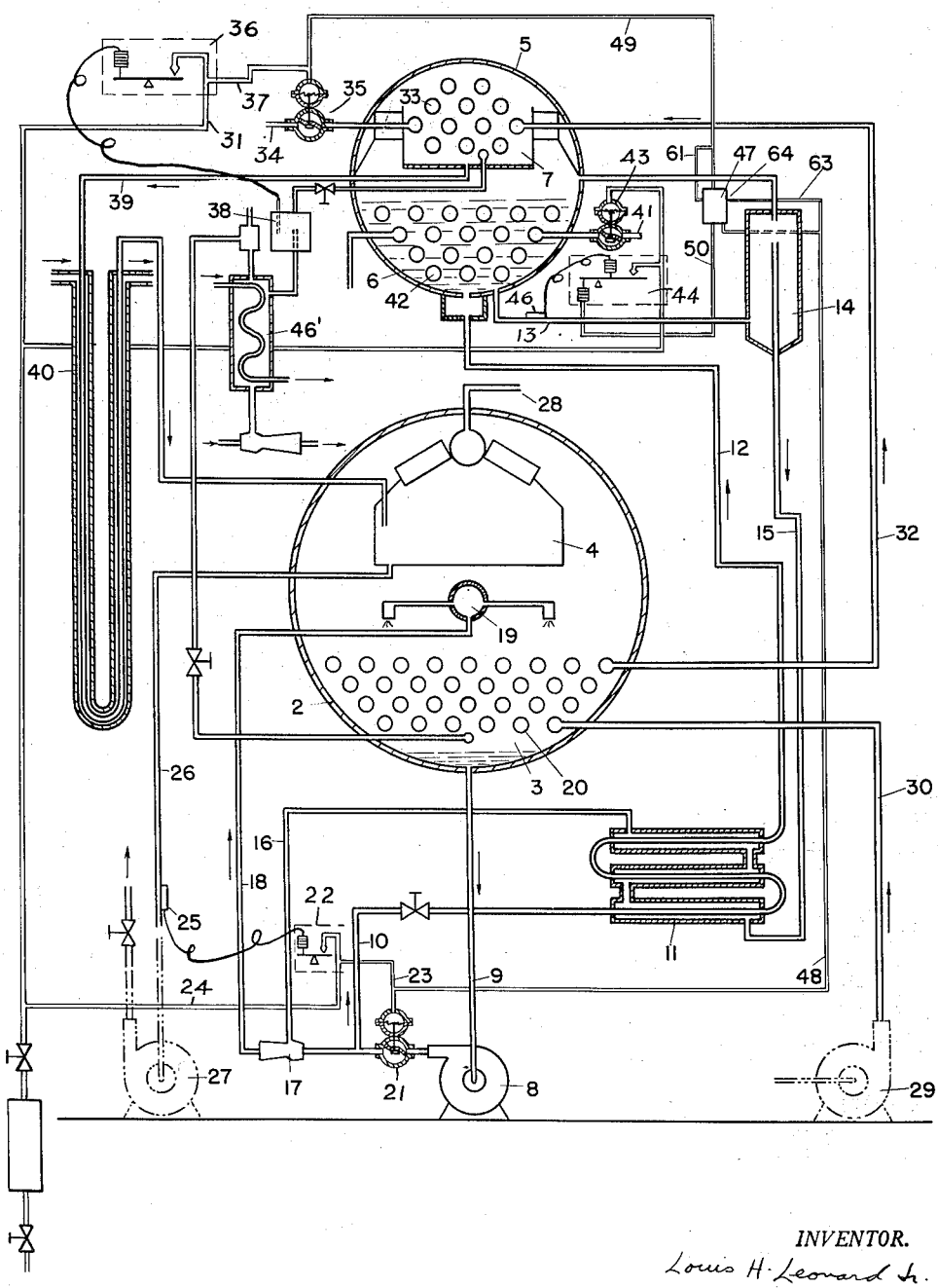

Jan. 15, 1952 L. H. LEONARD, JR 2,582,838
CONTROL MECHANISM FOR ABSORPTION REFRIGERATION SYSTEMS
Filed June 16, 1949 2 SHEETS—SHEET 1

INVENTOR.
Louis H. Leonard Jr.
BY

Jan. 15, 1952  L. H. LEONARD, JR  2,582,838
CONTROL MECHANISM FOR ABSORPTION REFRIGERATION SYSTEMS
Filed June 16, 1949  2 SHEETS—SHEET 2

INVENTOR.
Louis H. Leonard Jr.
BY

Patented Jan. 15, 1952

2,582,838

UNITED STATES PATENT OFFICE 2,582,838

CONTROL MECHANISM FOR ABSORPTION REFRIGERATION SYSTEMS

Louis H. Leonard, Jr., Syracuse, N. Y., assignor to Carrier Corporation, Syracuse, N. Y., a corporation of Delaware Application June 16, 1949, Serial No. 99,489

5 Claims. (Cl. 62—5)

1

This invention relates to absorption refrigeration systems and more particularly to an absorption refrigeration system including a reset arrangement to reset or adjust a control regulating passage of heating medium to the generator of the system in response to chilled water temperature or saturation temperature corresponding to pressure in the generator-condenser shell.

The chief object of the present invention is to provide a simple and effective control mechanism for adjusting the control point of a thermostat which actuates a valve regulating passage of steam to the generator of an absorption refrigeration system.

An object of the present invention is to provide a pneumatic control responsive to chilled water temperature and saturation temperature corresponding to pressure in the generator or boiler, to regulate passage of steam through the generator of the system upon loss in load, instrument failure, low condensing water temperature, freezing of chilled water, excessive air leakage into the system, failure of purge mechanism to purge such non-condensable gases from the system or solidification of absorbent.

A further object is to provide a simple control for adjusting or resetting the control point of a thermostat which actuates a valve regulating passage of steam to the tubes of the generator of an absorption refrigeration system, such control being responsive to a change in air pressure determined by temperature of chilled water or pressure in the generator reflected by dewpoint or saturation temperature whichever is the lower under variation from predetermined operating conditions. Other objects of my invention will be readily perceived from the following description.

This invention relates to an absorption refrigeration system comprising in combination an absorber, an evaporator, a generator and a condenser disposed in a closed circuit. Suitable valves and thermostats are provided to regulate the passage of solution through the system, passage of steam through the generator of the system and passage of condensing water through the condenser of the system. The controls are operated pneumatically, pressure in air lines connecting the controls to the respective valves is regulated in response to the temperature of chilled water, solution leaving the generator and saturation temperature reflecting pressure in the generator. Control mechanism is provided to reset the control point of a thermostat which governs a valve regulating passage of steam through the

2 coil of the generator. Such control mechanism is connected to air lines connecting the respective thermostats with the solution valve and the condensing water valve. The control mechanism is so designed as to be responsive to changes in air pressure in such lines. If the pressure in the air line connecting the chilled water thermostat with the solution valve is greater than pressure in the air line connecting the condensing water thermostat with the valve in the condensing water line then such control mechanism will be responsive to pressure in the first air line, resetting the steam control in accordance with temperature of chilled water. If, however, pressure in the second line is greater than pressure in the first line then the control mechanism will be responsive to pressure in the second line as regulated in response to saturation temperature corresponding to pressure in the generator.

Figure 2:
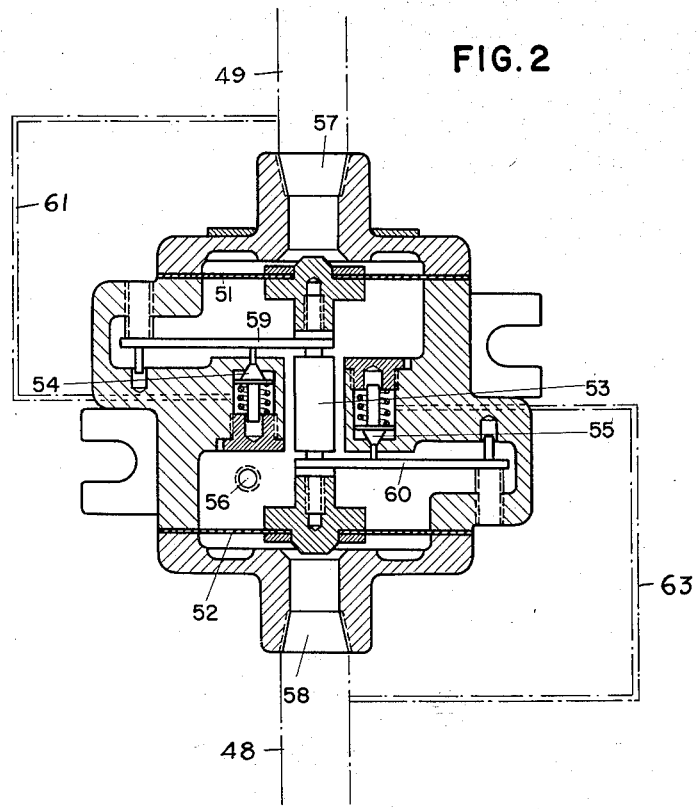

The attached drawing illustrates a preferred embodiment of my invention, in which Figure 1 is a diagrammatic view of an absorption refrigeration system including the control mechanism of the present invention; and Figure 2 is a sectional view of the control mechanism shown in Figure 1.

Referring to the drawing, there is shown in Figure 1 an absorption refrigeration system to which the present invention is applied. Such a system includes a shell 2 containing a coil member and a tank member which, in cooperation with shell 2, form an absorber 3 and an evaporator 4 respectively. A second shell 5 contains coils which, in cooperation with shell 5, form a generator 6 and a condenser 7. Absorber 3 is connected to a solution pump 8 by a line 9. Solution pump 8 forwards weak solution from absorber 3 through line 10, heat exchanger 11 and line 12 to generator 6. Strong solution passes from generator 6 through line 13, over-flow 14, line 15, heat exchanger 11 and line 16 to ejector 17. Pump 8 discharges some portion of weak solution into ejector 17, thereby inducing strong solution from line 16 and forwarding the mixture of solutions through line 18 to spray mechanism 19 which serves to spray the solution over the tubes 20 of the absorber 3.

Valve 21 regulates passage of solution through the system. Valve 21 is controlled by a thermostat 22 and is connected to thermostat 22 by air line 23. Thermostat 22 is connected to air supply line 24. Air pressure in line 23 is determined by means of a bulb 25 disposed adjacent the chilled water line. Temperature of chilled water as reflected by bulb 25 actuates thermostat 22 thereby varying the air pressure in line 23 by permitting some portion of the applied air pressure to vent to atmosphere.

Chilled water is withdrawn from evaporator 4 through line 26 and is circulated by pump 27 through a suitable heat exchanger (not shown); chilled water returns to the evaporator from the heat exchanger through line 28 and is sprayed in the evaporator to flash-cool the same.

Cooling and condensing water is forwarded by pump 29 through line 30 to the tubes 26 of absorber 3. Cooling water passes through tubes 26 and is then forwarded through line 32 to coil 33 of condenser 7 and is discharged from coil 33 through line 34. A valve 35 in line 34 regulates passage of cooling and condensing water through the absorber and condenser.

Valve 35 may be actuated by means of thermostat 36 responsive to air pressure in the main supply line being connected thereto by line 31. An air line 37 connects valve 35 and thermostat 36. Air pressure in line 37 may be regulated if is response to saturation temperature corresponding to condenser pressure as reflected by a bulb 38, disclosed in the copending application of A. A. Berestneff, Serial No. 692,296, filed August 22, 1946, now Patent No. 2,550,665, dated May 1, 1951.

Condensate line 39 connects condenser 7 with evaporator 4, condensate being sprayed into evaporator 4 and being flash-cooled therein. A loop 40 is provided in line 39 to assure that differences in pressure are maintained between shells 2 and 5.

Steam from line 41 is passed through the tubes 42 of generator 6. Valve 43 in line 41 regulates passage of steam through tubes 42. Valve 43 is connected to thermostat 44 by air line 43' and is controlled by means of thermostat 44 connected to a source of air supply, as hereinafter described. A bulb 46 under normal conditions regulates thermostat 44 so that valve 43 is actuated in response to the temperature of strong solution leaving generator 6. Suitable purge mechanism 46 may be provided to purge non-condensable gases from the condenser and absorber of the system.

The system and the control arrangements therefor so described are disclosed and claimed in the copending applications of Alexis A. Berestneff, Serial No. 683,387, filed July 13, 1946, now Patent No. 2,565,943, dated August 28, 1951, and Alexis A. Berestneff and William L. McGrath, Serial No. 683,390, filed July 13, 1946, now Patent No. 2,565,838, dated August 28, 1951, to which reference is made for a more full and complete description.

Control mechanism is provided as shown at 47 to reset or adjust valve 43 controlling passage of steam through tubes 42 of generator 6. Such mechanism is connected by line 48 to air line 23, connecting thermostat 22 and valve 21. Control 47 is also connected by line 49 to air line 37 connecting thermostat 36 and condensing water valve 35. Control 47 is connected by line 50 to thermostat 44.

Control 47 is shown in Figure 2. It includes an upper diaphragm 51 and a lower diaphragm 52, air pressure in lines 49 and 48 being imposed against such diaphragms respectively. The diaphragms are connected by a center post assembly 53. Disposed between diaphragms 51 and 52 are valve members 54 and 55. Such members in turn are connected to a port 56 leading to line 50. Air pressure from line 49 is applied to diaphragm 51 through port 57. Air pressure in line 48 is applied to diaphragm 52 through port 58.

Considering operation of such control mechanism, air pressure from line 49 is applied to diaphragm 51 and air pressure from line 48 is applied to diaphragm 52. When air pressure in line 48 is less than air pressure in line 49 center post assembly 53 moves downward. At the same time, levers 59 and 60 move downward opening valve 54 and closing 55. Air line 61 connected to line 49 and to a port of the control 47 permits air pressure from line 49 to pass through valve 54 and to thermostat 44 through line 50.

Air pressure in line 48, connected to port 58 and through branch air line 63 to a port 64 of control 47, is not effective until it exceeds the pressure in line 49 acting against diaphragm 51. At such time, center post assembly 53 will move upward closing valve 54 and opening valve 55. The branch line pressure connected at port 64 will then pass through valve 55 and to thermostat 44 through line 50.

Thermostat 44 may be reset by varying the air pressure imposed therein in accordance with air pressures in lines 23 and 37, such pressures, of course, being varied in accordance with the temperature of chilled water leaving the evaporator 4 and the saturation temperature corresponding to pressure in the generator-condenser shell. Under usual conditions, of course, bulb 46 regulates thermostat 44 to actuate valve 43 by varying the air pressure imposed therein. Control 47 varies the air pressure passing to thermostat 44 thus resetting or adjusting the operation of the thermostat as determined by bulb 46. Control 47 determines the air pressure in line 50 and permits such pressure to be determined in accordance with the temperature of chilled water or saturation temperature corresponding to pressure in the condenser-generator shell depending upon whether the air pressure in line 23 is less or greater than air pressure in line 37.

The present invention provides a ready and effective means of controlling or resetting thermostat 44 to regulate passage of steam through generator 6. It serves in effect as a safety control permitting use of lower condensing water temperatures thereby saving water while assuring that operation of the system is well away from the freezing line. It permits operation of the system at low concentrations of solution without freezing. If, for example, non-condensable gases in the system, due to failure of the purge mechanism, prevent the machine from doing useful work, the steam valve control is reset in accordance with condensing water temperature; at start-up, for example, the steam control is reset in accordance with the temperature of chilled water leaving the evaporator.

In effect, the present invention permits a dual reset of the steam valve control, thereby preventing unsatisfactory operation upon failure of the purge mechanism, excessive air leakage into the system, loss of load, instrument failure, low condensing water temperatures or similar undesirable operating conditions.

While I have described a preferred embodiment of the present invention, it will be understood my invention is not limited thereto since it may be otherwise embodied within the scope of the following claims.

I claim:

1. In an absorption refrigeration system, the combination of an absorber, an evaporator, a condenser and a generator, a valve for regulating passage of solution through the system, a control, an air line connecting the control and the valve, said control actuating said valve, a second valve for regulating passage of steam through the generator, a second control for regulating operation of said second valve, a third valve for regulating passage of condensing water through the condenser, a third control, a second air line connecting the third control and the third valve, said third control actuating the third valve, a source of supply of compressed air connected to the first and third controls, control mechanism connected to the first air line and to the second air line, and a third air line connecting said mechanism to the second control, said mechanism being responsive to differences in air pressure in the first and second air lines whereby the first air line is connected to the third air line or the second air line is connected to the third air line in accordance with the respective pressures in said first and second air lines.

2. In an absorption refrigeration system, the combination of a shell, a member in said shell cooperating therewith to form an absorber, a second member in said shell cooperating therewith to form an evaporator, a second shell disposed adjacent the first shell, a member in said second shell cooperating therewith to form a generator, a second member in said second shell cooperating therewith to form a condenser, a valve for regulating passage of solution through the system, a control, an air line connecting the control and said valve, said control regulating operation of the valve, a second valve for regulating passage of steam through the generator, a second control for regulating operation of said second valve, a third valve for regulating passage of condensing water through the condenser, a third control, a second air line connecting the third control and the third valve, said third control regulating operation of the third valve, control mechanism connected to the first air line and to the second air line, and a third air line connecting said mechanism to the second control, said mechanism being responsive to differences in air pressure in said first air line and said second air line whereby the first air line is connected to the third air line or the second air line is connected to the third air line in accordance with the respective pressures in said first and second air lines.

3. A system according to claim 2 in which a bulb is connected to the second control, said bulb being disposed adjacent the strong solution line of the system and reflecting temperature of solution leaving the generator, said bulb regulating said control in accordance with the temperature of solution leaving the generator thereby varying air pressure imposed on the second valve to regulate passage of steam through the generator.

4. A system according to claim 3 in which a bulb serves to regulate the first control, said bulb being disposed adjacent the chilled water line and serving to reflect the temperature of chilled water, said first control in accordance with change in temperature of chilled water varying air pressure in the first air line to actuate the solution valve.

5. A system according to claim 4 in which means are provided to reflect saturation temperature corresponding to pressure in the generator to actuate the third control.

LOUIS H. LEONARD, JR.

REFERENCES CITED

The following references are of record in the file of this patent:

UNITED STATES PATENTS

| Number | Name | Date |
|---|---|---|
| 2,287,441 | McGinnis | June 23, 1942 |
| 2,461,513 | Berestneff | Feb. 15, 1949 |